United States Patent
Lewis, Jr. et al.

[19]

[11] Patent Number: 6,131,385
[45] Date of Patent: Oct. 17, 2000

[54] INTEGRATED PULSED PROPULSION SYSTEM FOR MICROSATELLITE

[75] Inventors: David H. Lewis, Jr., Irvine; Erik K. Antonsson, Pasadena, both of Calif.

[73] Assignees: TRW Inc., Redondo Beach; California Institute of Technology, Pasadena

[21] Appl. No.: 08/912,709

[22] Filed: Aug. 18, 1997

[51] Int. Cl.[7] ....................................... F03H 5/00
[52] U.S. Cl. ........................ 60/203.1; 137/68.19
[58] Field of Search ............................ 60/203.1, 200.1; 137/68.19, 74, 76

[56] References Cited

U.S. PATENT DOCUMENTS

| | | | |
|---|---|---|---|
| H795 | 7/1990 | Maykut et al. | 60/233 |
| 3,316,719 | 5/1967 | Loprete . | |
| 4,399,655 | 8/1983 | Fohl . | |
| 5,661,970 | 9/1997 | Muller et al. | 60/223 |
| 5,857,698 | 1/1999 | Fuerst et al. | 137/68.19 |

FOREIGN PATENT DOCUMENTS

| | | |
|---|---|---|
| 8226790 | 9/1996 | Japan . |
| 9209916 | 8/1997 | Japan . |
| 9822719 | 5/1998 | WIPO . |

*Primary Examiner*—Louis J. Casaregola
*Attorney, Agent, or Firm*—Michael S. Yatsko

[57] ABSTRACT

A propulsion system and, in particular, a microthruster for a microsatellite. The microthruster may be formed as a resistojet type thruster formed with a chamber, closed by a diaphragm which acts as a blow-out disk. A fluid, such as an inert gas, is disposed within the chamber. Heating of the gas causes the gas pressure to increase until the diaphragm ruptures, which, in turn, causes the gas to flow out of the chamber, acting as a propellant, and providing a small unit force. The microthruster is adapted to be formed by known batch processing methods with $10^4$–$10^6$ microthrusters per wafer. The unit of force can be easily scaled by varying the number of microthruster 20 used for an application, the geometry of the chamber 22, as well as the type of fluid used within the chamber, to suit the microsatellite application.

12 Claims, 2 Drawing Sheets

INTEGRATED PULSED PROPULSION SYSTEM FOR MICROSATELLITE

GOVERNMENT RIGHTS

The U.S. Government has certain rights in this invention pursuant to Grant No. MIP9529675 awarded by National Science Foundation.

BACKGROUND OF THE INVENTION

1. Field of the Invention

The present invention relates to a propulsion system for a microsatellite, and, more particularly, to a micro-machined propulsion system formed with a small chamber closed by a diaphragm, which holds a small volume of a fluid or gas, such as inert gas. Heating of the fluid causes the fluid pressure to increase until the blow-out disk or diaphragm ruptures, which, in turn, causes the fluid to flow out of the chamber, acting as a propellant.

2. Description of the Prior Art

Microsatellites are satellites with massses ranging from 1 kilogram (kg) to about 10 kg. Nanosatellites are satellites with masses less than 1 kg. As used hereafter, all such satellites are identified as microsatellites. Microsatellites are used in a myrid of applications, including: sensor modules flying in formation with larger spacecraft radiation monitors; spectrometers; surface-charging monitors; CCD camera used in, imaging boom deployments and/or surface contamination monitors; constellations of satellites for communications systems; constellations of earth-observing satellites; distributed sensing the properties in the thermosphere; distributed weather satellites; surveillance satellites, for weapon system interceptors, and other applications.

Various microsatellites are known in the art. Examples of such microsatellites are disclosed in "Chemical and Electric Micropropulsion Concepts for Nanosatellites", by S. W. Janson, Copyright 1994, *American Institute of Aeronaotics and Astronautics, Inc.*; "Batch-Fabricated Microthrusters: Initial Results", by S. W. Janson and H. Helavajian, Copyright 1996, *American Institute of Aeronaotics and Astronautics, Inc.*

Conventional propulsion systems deliver too great a force and are too heavy for use with such microsatellites. Thus alternate propulsion systems are known to be used in such applications. For example, one known propulsion system for use in such an application, used primarily for orbit adjustment and satellite attitude control, provides a motive force to the satellite by introducing a propellant into a thrust chamber, reacting it and expelling it through the nozzle. Such a system consists of a minimum of 12 thrusters and a multitude of values, tanks, lines and sensors. Such a configuration is relatively complicated and relatively expensive to make.

A new class of microthrusters, as dicussed above, have been developed, that are adapted to be fabricated on a batch basis in a similar manner to microelectrons. Both chemical microthrusters and electric microthrusters are known. Chemical microthrusters include cold gas thrusters and hydrazine monopropellant thrusters. Cold gas thrusters include a converging/diverging nozzle that is used to expand the propellant, such as hydrogen, nitrogen or helium to develop an impulsive force. Unfortunately, the storage density of hydrogen at practical pressures and temperatures for use in a microsatellite is impractical.

Hydrazine monopropellant microthrusters are also known. Such hydrazine monopropellant thrusters are relatively complicated and include a large number of moving parts such as a nozzle, and a large number of moving parts such as a nozzle, and a microvalve array. Such monopropellant type microthrusters also require a microcontroller.

As mentioned above, electric microthrusters are also known. Such electric microthrusters include resisto-jets as well as electrostaticthrusters. As generally described in "Chemically and Electrically Micropropulsion Concepts for Satellites", supra, resisto-jets use electric heaters to expand the pressure of a propellant which, in turn, is expelled through an exhaust nozzle, creating a motive force. The problem with known resisto-jet type microthrusters is the volume of storage space required for the propellant. Electrostatic microthruster, on the other hand, require metal in a molten state.

SUMMARY OF THE INVENTION

It is an object of the present invention to solve various problems in the prior art.

It is yet another object of the present invention to provide a propulsion system for a microsatellite.

It is yet another object of the present invention to provide a propulsion system for a microsatellite which is relatively simple and less complicated than propellant type systems.

It is yet a further object of the present invention to provide a microthruster capable of being fabricated by batch processing similar to integrated microelectronics.

Briefly the present invention relates to a propulsion system and in particular to a microthruster for a microsatellite. The microthruster may be formed as a reistojet type thruster formed with a chamber, closed by a diaphragm which acts as a blow-out disk. A fluid, such as an inert gas, is disposed within the chamber. Heating of the gas causes the gas pressure to increase until the blow-out disk ruptures, which, in turn, causes the gas flow out of the chamber, acting as a propellant, and providing a small force equivalent to an impulse bit. The microthruster is adapted to be formed by batch processing in a similar manner as an integrated circuit with $10^4$–$10^6$ (or more) microthrusters per wafer. As such, the impulse force can be scaled relatively easily to suit the microsatellite application.

BRIEF DESCRIPTION OF THE DRAWINGS

These and other objects of the present invention will be readily understood with reference to the following specification and attached drawings, wherein.

DETAILED DESCRIPTION OF THE INVENTION

Figure 1:
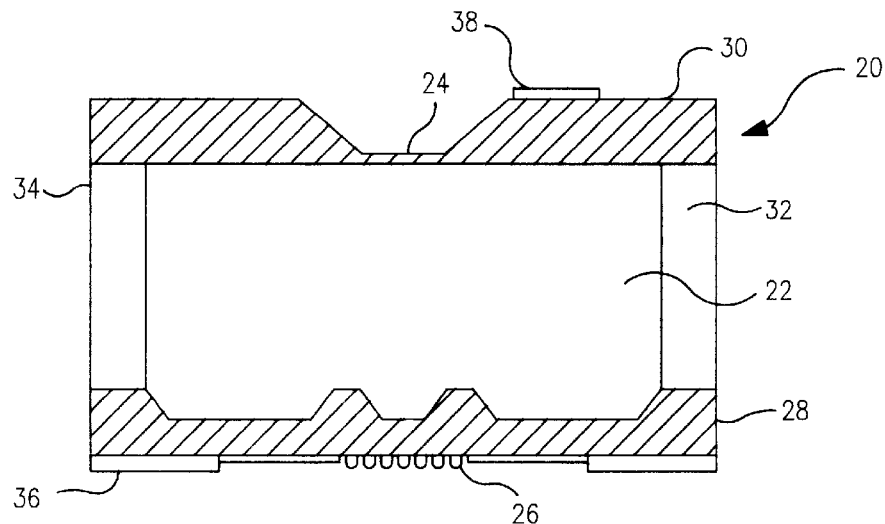
FIG. 1 is a sectional view of the microthruster in accordance with the present invention.

The present invention relates to a microthruster for a microsatellite. The microthruster is generally illustrated in FIG. 1 and identified with the reference numeral 20. The microthruster 20 in accordance with the present invention provides many advantages over known microthrusters. For example, the microthruster 20 is formed with no moving parts and can be easily modified by altering the geometric configuration. As will be discussed below, the microthruster 20 is adapted to be fabricated by laser machine techniques, as well as batch processing techniques normally used for microelectronics. An important aspect of the invention is that the microthruster 20 can provide relatively precise control of the microsatellite. As mentioned above, each microthruster 20 is adapted to provide a unit of force analogous to a bit in a digital logic system and, thus, may be considered as a digital propulsion system. The magnitude of the unit of force may be controlled by the geometry of the chamber 22, as well as the number of microthrusters 20 used in a particular application. More specifically, as mentioned above, the microthruster 20 is adapted to be fabricated using known batch processing techniques, for example, as used for microelectronics. As such, arrays of microthrusters 20, can be formed with, for example $10^4$–$10^6$ (or more), microthrusters per wafer. With such a configuration, the magnitude of the force can be relatively precisely controlled by various factors, including the size of the chamber 22, as well as the number of microthrusters 20 in an array. Also, as will be discussed below, other factors, such as the type of gas used in the chamber, affect the magnitude of the unit of force.

Referring to FIG. 1, the microthruster 20 is formed with a chamber 22, for example, formed in a generally cube or other, for example, hexagonal, octagonal, pyramidal, cylindrical, hemispherical, spherical, conical, etc. shape, for carrying a fluid or gas, such as an inert gas, that is closed by a diaphragm 24 or is formed with a portion less resistant to rupture from elevated fluid pressure than other portions of said chamber 22. The diaphragm 24 acts as a blow-out disk. The diaphragm 24 may be centered on top of the chamber 22, and may be the same size as the top of the chamber, or smaller as shown in FIG. 1, the electric resistance element 26 may be disposed adjacent (or inside) a side of the chamber 22, opposite the diaphragm 24. When a fluid is placed within the chamber 22, thermal energy added to the fluid by way of the electrical resistance element 26 may be centered on the bottom portion of, or inside the chamber 22 as shown. When the fluid pressure expands to a pressure equivalent to the rupture pressure of the diaphragm 24, the diaphragm 24 ruptures, which, in turn, causes the fluid to flow out of the chamber 22, acting as a propellant in the same sense as a punctured balloon. A diverging nozzle as shown in FIG. 1 may be used, but is not necessary.

The chamber 22 may be formed by top and bottom silicon wafers 28 and 30 or other suitable materials. The sidewalls of the chamber 22 may be formed by way of silicon or glass spacers 32 and 34 or other suitable materials. In order to provide relatively accurate control of the microthrusters 20, address and sensor electronics, generally identified with the reference numeral 36, can be integrated into the microthruster 20, as generally shown in FIG. 1. Thus, in a microsatellite application, the amount of thrust can be relatively accurately controlled electronically in order to control the amount of force.

As mentioned above, the electrical resistance element 26 expands the fluid within the chamber 22 to cause the diaphragm 24 rupture. In order to prevent debris from the diaphragm 24 from damaging the particular microsatellite with which it is used, a metal trace 38 may be disposed adjacent the top layer of silicon 30.

Figure 2:
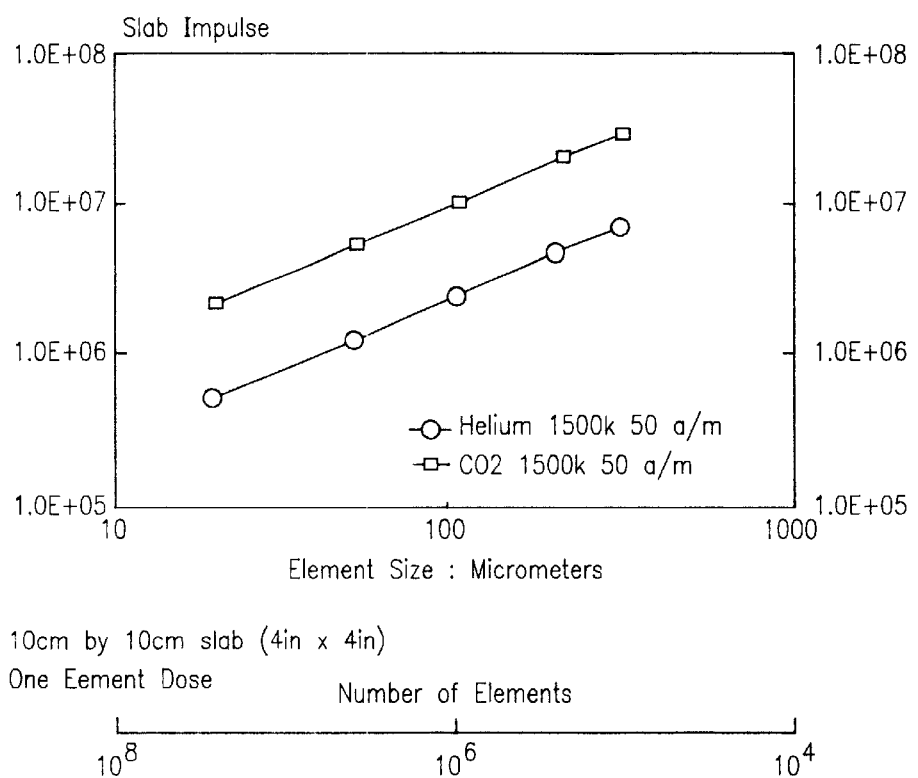
FIG. 2 is a graphical illustration of the impulse force as a function of the gas type and microthruster size for a microthruster in accordance with the present invention.

Various fluids including inert gases, are suitable for use within the chamber 22, such as nitrogen, argon, xenon, helium and carbon dioxide, FIG. 2 illustrates the performance of helium and carbon dioxide. The vertical axis indicates the total force for a microthruster array in nano-Newton-seconds, as a function of the elemental size of the microthrusters in the array for both helium and carbon dioxide gases. As illustrated in FIG. 2, the carbon dioxide gas provides more force than the helium. Also, the amount of force for either of the gases decreases as a function of the elemental size of each microthruster 20.

Figure 3:
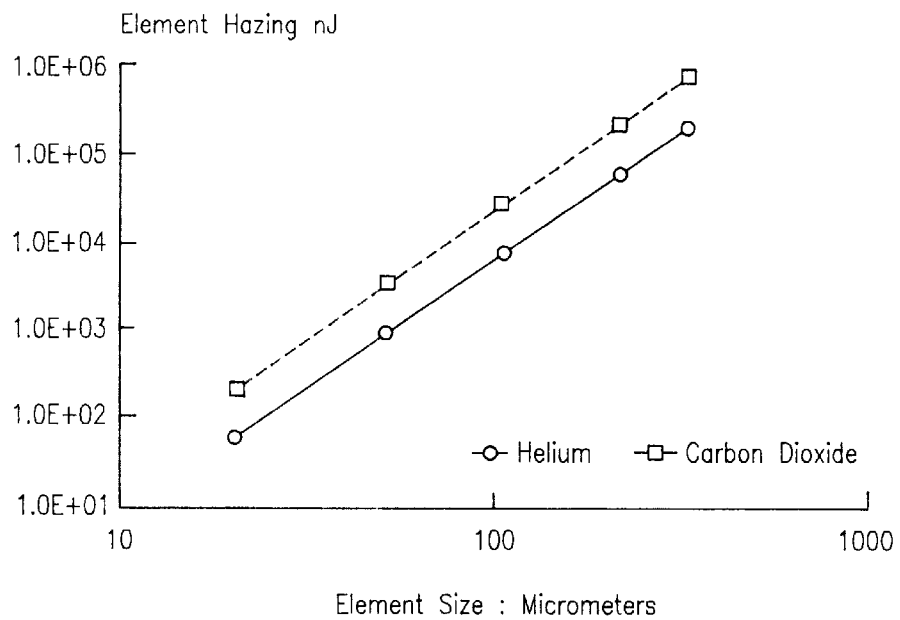
FIG. 3 is a graphical illustration of the heat required for rupture for the microthruster in accordance with the present invention as a function of the size of the microthruster.

FIG. 3 is a graphical illustration of the amount of heat required to heat the microthruster from 300° Kelvin at 10 atmospheres to 1500° at 50 atmospheres for both helium and carbon dioxide gases. The vertical axis represents the elemental heating in nano Joules to the heat element, while the horizontal axis illustrates the size of the element in micrometers, varying from 10 to 1,000 micrometers. As illustrated in FIG. 3, more heating is required for carbon dioxide gas than for helium gas. Moreover, as expected, the amount of heating varies as a function of the size of the microthruster.

Figure 4:
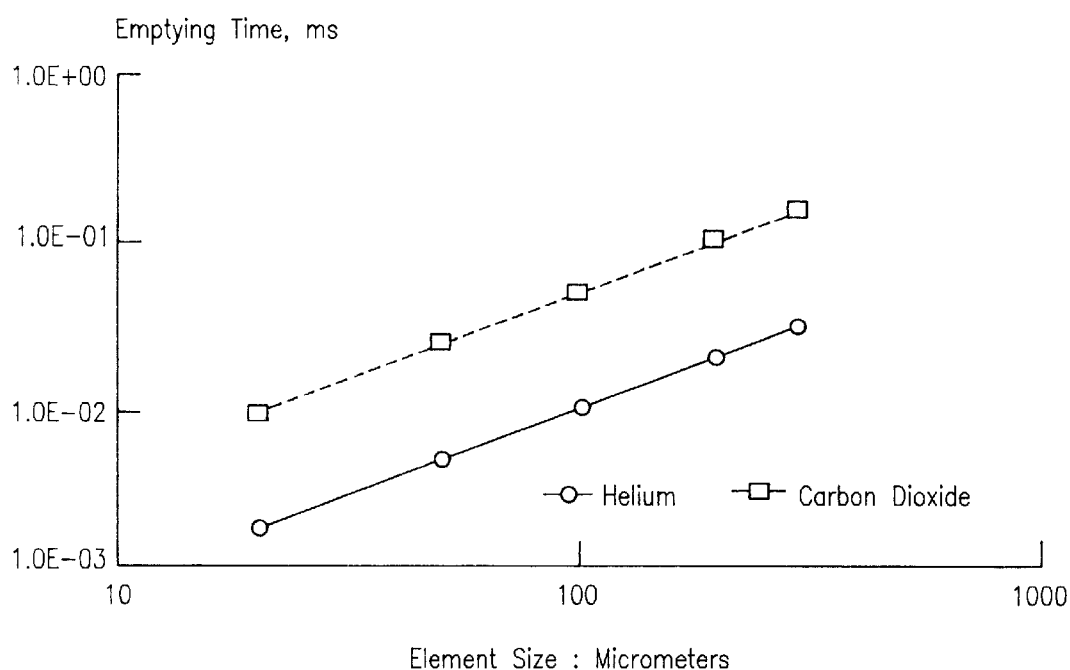
FIG. 4 is a graphical illustration of the blow-out time for the microthruster in accordance with the present invention as a function of the size of the chamber.

FIG. 4 is a graphical illustration of the predicted blow-down time for microthrusters using helium gas and carbon dioxide gas as a function of the size of the microthruster 20. The vertical axis represents the emptying time in milliseconds, while the horizontal axis represents the size of the microthruster in micrometers. As shown in FIG. 4 the helium gas empties more quickly than the carbon dioxide, and, as expected, the emptying time is greater for larger size microthrusters 20.

The microthruster 20 may be fabricated using various micromachining techniques, including laser micromachining techniques, as well as batch processing techniques normally used for microelectronics. In particular, the microthruster 20 is adapted to be fabricated using microelectro-mechnical system (MEMS) techniques, such as bulk anisotropic etching of mono-crystalline silicon (or other substrates), or plasma etching, or reactive ion etching, a deposition, patterning and removal of layers applied to a substrate, or laser machining.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A microthruster for use in a microsatellite, the microthruster comprising:

a chamber for carrying a fluid, said chamber open on one end and formed from a first predetermined material suitable for micromachined electro-mechanical system (MEMS) processing;

a diaphragm for closing said open end of said chamber, said diaphragm formed from a second predetermined material suitable for MEMS processing; and an electric resistance element disposed relative to said chamber to transfer thermal energy to the fluid in said chamber.

2. The microthruster as recited in claim 1, wherein said chamber is formed in a generally cylindrical shape.

3. The microthruster as recited in claim 1, wherein said fluid is a gas.

4. A microthruster comprising:

a closed chamber for carrying a fluid with a portion of said chamber less resistant to rupture from elevated fluid pressure than other portions of said chamber, said chamber formed from a predetermined material suitable for MEMS processing; and means for transferring thermal energy to said fluid in said chamber.

5. A microthruster as recited in claim 4, wherein said fluid is gas.

6. A microthruster as recited in claim 4, wherein said transferring means includes an electric resistor element.

7. The microthruster as recited in claim 1, further including an address contact formed adjacent said electric resistance element and electrically coupled thereto to enable selective addressing of said electric resistance element.

8. The microthruster as recited in claim 1, wherein said first predetermined material is silicon.

9. The microthruster as recited in claim 1, wherein said first predetermined material is glass.

10. The microthruster as recited in claim 1, wherein said second predetermined material is silicon.

11. The microthruster as recited in claim 4, wherein said predetermined material is silicon.

12. The microthruster as recited in claim 4, further including an address contact electrically coupled to said transferring means for enabling selective addressing of said transferring means.

* * * * *